United States Patent [19]
Kriebel et al.

[11] Patent Number: 5,096,683
[45] Date of Patent: Mar. 17, 1992

[54] PROCESS OF COMBUSTING AN $H_2S$-CONTAINING GAS

[75] Inventors: Manfred Kriebel, Frankfurt am Main; Herbert Fischer, Lollar; Ulrich Sander, Friedrichsdorf, all of Fed. Rep. of Germany

[73] Assignee: Metallgesellschaft Aktiengesellschaft, Frankfurt am Main, Fed. Rep. of Germany

[21] Appl. No.: 558,989

[22] Filed: Jul. 27, 1990

[30] Foreign Application Priority Data

Aug. 5, 1989 [DE] Fed. Rep. of Germany ....... 3925985

[51] Int. Cl.$^5$ .......................... C01B 3/00; B01D 59/10
[52] U.S. Cl. .................................. 423/248; 423/573.1; 423/648.1; 423/542; 23/293 S; 55/16
[58] Field of Search ................. 423/573.1, 574 R, 248, 423/567 A, 648.1; 23/293 S; 55/16

[56] References Cited

U.S. PATENT DOCUMENTS

| | | | |
|---|---|---|---|
| 4,439,412 | 3/1984 | Behie | 423/573 G |
| 4,481,181 | 6/1984 | Norman | 423/573 G |
| 4,575,453 | 3/1986 | Reed | 422/149 |
| 4,632,819 | 12/1986 | Fischer et al. | 423/574 R |
| 4,772,366 | 9/1988 | Winnick | 204/128 |

FOREIGN PATENT DOCUMENTS 0160332  6/1985  European Pat. Off. .
3507617  4/1986  Fed. Rep. of Germany ... 423/574 R
53-130291 11/1978  Japan .

OTHER PUBLICATIONS

"Alumina as a Ceramic Material", edited by Walter H. Gitzen, American Ceramic Society, Columbus, Ohio, (1970) pp. 17–19.
PATENT ABSTRACTS OF JAPAN, vol. 3, No. 7 (C-34) 24 Jan. 1979 and JP-A-53 130291 KOGYO GIJUTSUIN) 14 Nov. 1978.

Primary Examiner—Gary P. Straub
Assistant Examiner—Timothy C. Vanoy
Attorney, Agent, or Firm—Sprung Horn Kramer & Woods

[57] ABSTRACT

An $H_2S$-containing gas is combusted with oxygen in at least one burner, which discharges into a combustion chamber. The resulting mixed gases contain $H_2S$, $SO_2$, free hydrogen and elementary sulfur and are at temperatures of about 900° to 2000° C. At temperatures of about 900° to 2000° C. at least part of the free hydrogen is removed from said mixed gases. The free hydrogen may be removed from the mixed gases, e.g., through membranes.

4 Claims, 1 Drawing Sheet

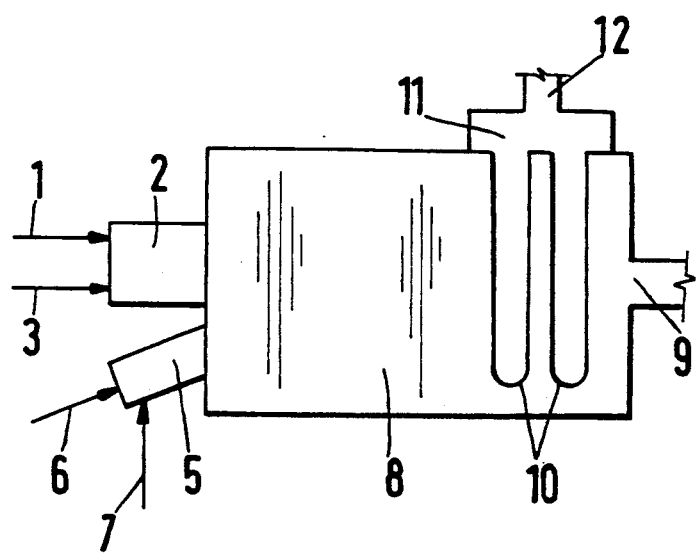

PROCESS OF COMBUSTING AN H₂S-CONTAINING GAS

This invention relates to a process of combusting an $H_2S$-containing gas with oxygen in at least one burner, which discharges into a combustion chamber in order to produce mixed gases which contain $H_2S$, $SO_2$, free hydrogen and elementary sulfur and are at temperatures of about 900° to 2000° C.

When it is desired to convert $H_2S$-containing gas by the Claus process and to recover elementary sulfur, the $H_2S$ is first partly combusted to form $SO_2$ in a manner which has been known for a long time. Details have been described, e.g., in Published German Application 34 15 722 and the corresponding U.S. Pat. No. 4,632,819 and in Published German Application 37 35 002. In the known processing the mixed gases formed by the combustion are first sufficiently cooled so that the elementary sulfur can be condensed and removed. The remaining mixed gases are then usually passed through one or more catalytic stages for an improved desulfurization.

It is an object of the invention to remove sulfur as far as possible by the first condensation of the mixed gases which have been formed in the combustion chamber. This is accomplished in accordance with the invention in that the free hydrogen is removed at least in part from the mixed gases at temperatures of about 900° to 2000° C.

It has been found that the mixed gases produced in the combustion chamber contain substantial amounts of free hydrogen and elementary sulfur as a result of dissociation of $H_2S$. That dissociation takes place in an appreciable proportion at temperatures of about 900° C. and becomes more and more intense as the temperatures rise, but the cooling effected to condense the elementary sulfur will result in a re-formation of $H_2S$ in substantial amounts.

In order to avoid as far as possible the re-formation of $H_2S$ from the free hydrogen and elementary sulfur contained in the hot mixed gases, the invention teaches to remove the free hydrogen at least in part from the mixed gases when they are still at elevated temperatures. The free hydrogen is preferably removed from the mixed gases at temperatures in the range from about 1000° to 1700° C. At least 20% of the free hydrogen contained in the mixed gases is suitably removed before the mixed gases are cooled.

The free hydrogen can be removed at high temperatures through membranes which are directly contacted by the mixed gases. In that case the hydrogen will diffuse through the membrane whereas the other components of the mixed gases will not diffuse through the membrane. Suitable membranes consist of a porous layer, e.g., of gamma-alumina or corundum. The pore size of the porous layer is in most cases in the range from $2 \times 10^{-4}$ to 0.5 µm. The porous layer may be coated with a hydrogen-permable ceramic material, such as quartz or glass.

The removal of the free hydrogen as is taught by the invention will be particularly desirable if the $H_2S$-containing gas is to be desulfurized by the Claus process. Because free hydrogen is removed at an early stage, the amount of gas which comes from the combustion chamber and which after the condensation of elementary sulfur is to be fed to the catalytic converting stages is greatly decreased so that the costs of the entire process are appreciably reduced. Another advantage resides in that less oxygen is required in the combustion chamber and that the equilibrium will be obtained at lower temperatures.

BRIEF DESCRIPTION OF THE DRAWING

Optional further features of the process will be explained with reference to the drawing, which is a diagrammatic representation of a system for combusting $H_2S$-containing gas.

DETAILED DESCRIPTION

The $H_2S$-containing gas is fed in line 1 to a burner 2, which is fed through line 3 with the oxygen that is required for the combustion. Instead of oxygen it is possible to use air or oxygen-enriched air. In most cases a plurality of burners 2 are associated with one combustion chamber 8. If the heating value of the $H_2S$-containing gas is insufficient, a sustaining combustion may be performed by means of an auxiliary burner 5, which is fed with gaseous fuel through line 6 and with air through line 7. The combustion gases first flow into the combustion chamber 8 and are at temperatures of about 900° to 2000° C., in most cases 1000° to 1700° C., as they leave the combustion chamber through the outlet 9.

A plurality of baglike membranes 10 are contained in the combustion chamber 8 and consist of a porous material through which free hydrogen can easily diffuse and which will withstand the relatively high temperatures. The hydrogen from the interior of the membranes is initially collected in a chamber 11 and is then sucked off through the withdrawing line 12.

The mixed gases which have been depleted of hydrogen may be processed further by the Claus process and for that purpose may first be fed through the outlet 9 to means for effecting an indirect cooling and a separation of elementary sulfur in a manner known per se. This may be succeeded by further catalytic converting stages. The free hydrogen which has been removed is a valuable material, which can be used for various purposes, e.g., for hydrogenating.

EXAMPLE

In a laboratory-scale arrangement which is similar to that shown in the drawing but has no means for effecting a sustaining combustion, 1000 sm³ (sm³=standard cubic meter) of a gas consisting of 95% by volume $H_2S$ and 5% by volume $CO_2$ are combusted with commercially pure oxygen. The oxygen is supplied at such a controlled rate that the mixed gases leaving the combustion chamber 8 through the outlet 9 contain $H_2S$ and $SO_2$ at a molar ratio amounting fairly exactly to 2:1, as is desirable for the production of elementary sulfur by the Claus process. In a first experiment, 165 sm³ $H_2$ were sucked off from the combustion chamber through built-in membranes 10 and the withdrawing line 12. The membranes used for that purpose consisted of gramma-alumina and had the form of small tubes which were closed at one end and had a total surface area of 46 m². The pressure difference between the inside and outside surfaces of the membranes amounted to 0.1 bar.

For comparison, a second experiment was carried out without membranes 10 and without a removal of hydrogen. The temperature in the combustion chamber 8 close to the outlet 9 amounted to 1393° C. in the experiment using membranes and to 1566° C. in the experiment in which no membranes were used.

In the following Table, the amounts of oxygen required for the combustion, the amounts of the gas components (in sm$^3$) flowing through the outlet 9, and the total amounts of that gas, also in Nm$^3$, are stated. Column A is associated with the experiment in which membranes were used and column B with the control experiment using no membranes.

|                    | A      | B      |
|--------------------|--------|--------|
| Amount of oxygen   | 320.6  | 347.1  |
| H$_2$S             | 139.4  | 138.1  |
| SO$_2$             | 70.1   | 68.5   |
| H$_2$O             | 523.6  | 588.0  |
| H$_2$              | 122.0  | 223.9  |
| COS                | 0.8    | 0.6    |
| CO                 | 21.8   | 30.2   |
| CO$_2$             | 27.4   | 19.2   |
| S$_2$              | 369.8  | 371.4  |
| Total amount of gas| 1274.9 | 1439.9 |

The removal of 165 sm$^3$ H$_2$ in the experiment in which membranes were used resulted also in a surprisingly large saving of oxygen which was required for the combustion because less H$_2$O and, instead, mainly additional free hydrogen was produced in the combustion chamber. In the experiment in which membranes were used the desired H$_2$S:SO$_2$ molar ratio of about 2:1 is obtained at a lower temperature than in the experiment in which no membranes were used.

It will be understood that the specification and examples are illustrative but not limitative of the present invention and that other embodiments within the spirit and scope of the invention will suggest themselves to those skilled in the art.

What is claimed is:

1. A process which comprises combusting an H$_2$S-containing gas with oxygen at a temperature of about 900° to 2000° C. in a chamber containing a porous membrane of gamma-alumina or corundum, through which hydrogen can diffuse, the combustion producing a mixed gas containing H$_2$S, SO$_2$, free hydrogen and elementary sulfur, diffusing hydrogen through said membrane and withdrawing at said temperature the hydrogen diffused through said membrane, and removing the hydrogen-depleted mixed gas from said chamber.

2. A process according to claim 1, wherein at least 20% of the free hydrogen contained in the mixed gas is removed.

3. A process according to claim 1, including the additional steps of cooling the mixed gas to a temperature of at most 280° C. after free hydrogen has been removed, condensing and at least in part removing therefrom elementary sulfur.

4. A process according to claim 1, including the further steps of subjecting the mixed gas after removing the hydrogen at least in part to the Claus process.

* * * * *